April 5, 1966     S. M. LOVELESS     3,244,193
MULTIPLE VALVE UNITS
Filed Feb. 24, 1964     5 Sheets-Sheet 1
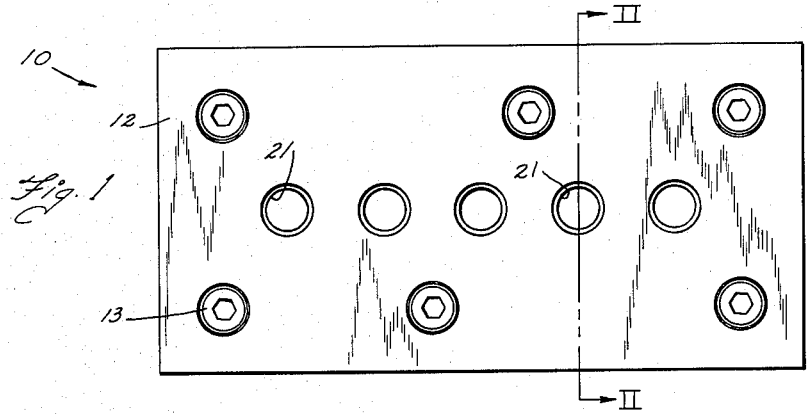
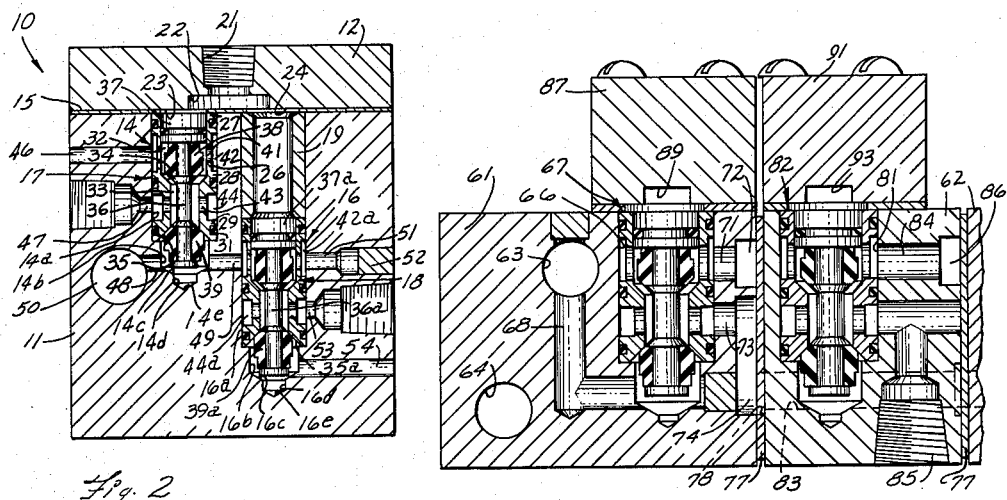
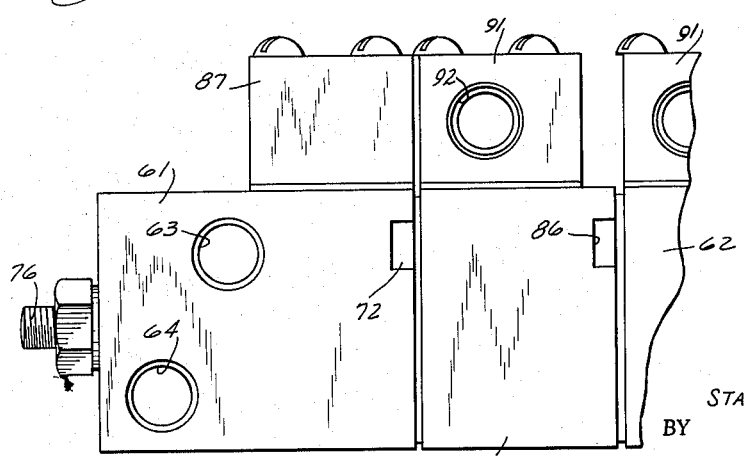
INVENTOR.
STANLEY M. LOVELESS
BY
ATTORNEYS

INVENTOR.
STANLEY M. LOVELESS
BY
ATTORNEYS

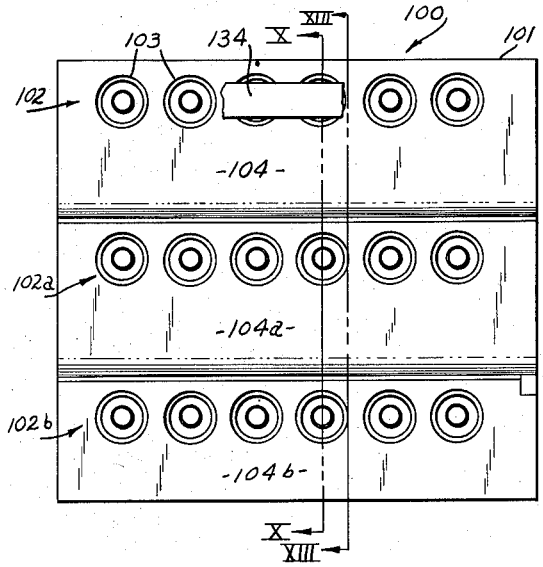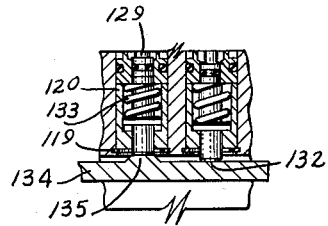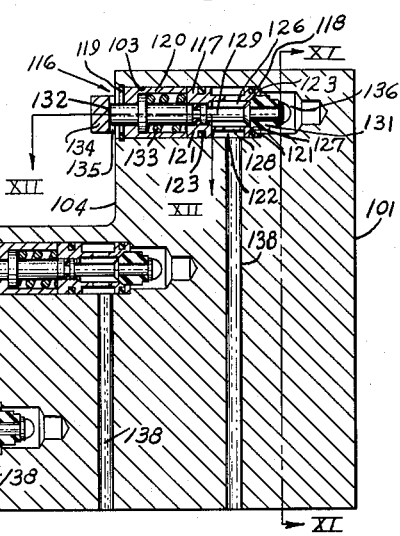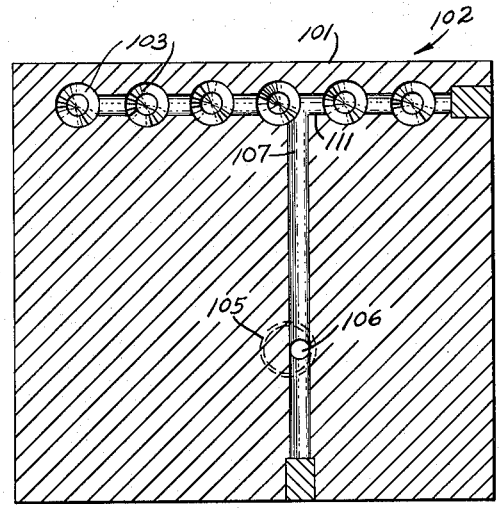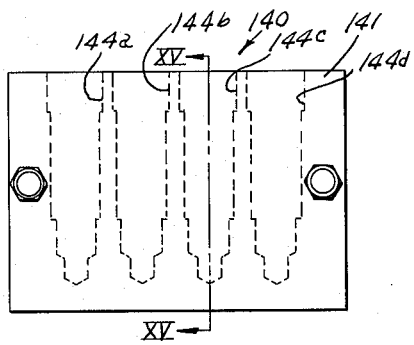

April 5, 1966  S. M. LOVELESS  3,244,193
MULTIPLE VALVE UNITS

Filed Feb. 24, 1964  5 Sheets-Sheet 5

INVENTOR.
STANLEY M. LOVELESS
BY
Woodhams, Blanchard and Flynn
ATTORNEYS

United States Patent Office 3,244,193
Patented Apr. 5, 1966

3,244,193
MULTIPLE VALVE UNITS
Stanley M. Loveless, Oshtemo Township, Kalamazoo County, Mich., assignor to General Gas Light Company, Kalamazoo, Mich., a corporation of Michigan
Filed Feb. 24, 1964, Ser. No. 346,957
13 Claims. (Cl. 137—454.6)

This invention relates to a valve manifold construction and, more particularly, relates to a valve manifold construction which makes it possible to provide a large number of valves in a simple, compact, valve manifold construction and which makes it possible to eliminate many of the external fittings, such as T's and elbows, heretofore used with multiple valve arrangements whereby the external piping arrangements can be considerably simplified.

Many machines employ a substantial number of pressure fluid operated devices, such as cylinders, which must be actuated in a predetermined sequence. Many valves and associated piping are required in order to provide a properly controllable supply of pressure fluid to such devices. The provision of separate valves involves considerable expense and such valves and the associated piping take up considerable space. In many instances, the space needed for separate valves and associated piping is not available. In other cases it usually is desirable anyway to minimize the space requirements. Consequently, various types of valve manifold constructions have been devised in order to meet this need for a compact multiple valve arrangement.

Prior valve manifold constructions have not been completely satisfactory. In many cases, they involve the use of specially designed valves which, because of limited demand, cannot be economically produced on a mass production basis. Such valves frequently require considerable maintenance because of their complicated design. Moreover, the manifold housings commonly have an extremely complex internal arrangement of passages and valve openings so that they are very expensive to manufacture. Further, the prior valve manifold constructions generally are adapted for use only with the particular type of machine for which are initially designed. Thus, in effect, the prior valve manifold constructions have to be customed designed for each particular installation. Because of this, the cost of such valve manifold constructions is relatively high so that they are used less frequently than might be expected.

Accordingly, the objects of the invention include the following:

(1) To provide a valve manifold construction which employs standard, mass produced, insert valves so that the valve costs are held to a minimum.

(2) To provide a valve manifold construction, as aforesaid, in which the valves have full size internal ports and have a short stroke so that they are very quick in operation and are capable of supplying large volumes of pressure fluid.

(3) To provide a valve manifold construction, as aforesaid, in which the valves can be actuated by a variety of different actuators, such as by cams, solenoid valves or other fluid pressure supplies, and by push buttons.

(4) To provide a valve manifold construction, as aforesaid, in which a variety of relatively simple manifold housings can be used, said housings being formable by simple metal working procedures so that the housings can be manufactured at relatively low cost.

(5) To provide a valve manifold construction, as aforesaid, in which the manifold housing can be constructed so as to permit easy access to the valves therein for replacement and repair.

(6) To provide a manifold construction, as aforesaid, in which by simple modifications of the valve housing and/or the placement or number of valves therein, the number and types of functions performed by the valve manifold can be readily changed to suit different requirements.

Other objects and advantages of the invention will become apparent to persons acquainted with equipment of this type upon reading the following disclosure and inspecting the accompanying drawings.

In the drawings:

FIGURE 1 is a top plan view of a valve manifold embodying the invention.

FIGURE 2 is a sectional view taken on the line II—II of FIGURE 1.

FIGURE 4 is an end elevational view of the valve manifold of FIGURE 3.

FIGURE 5 is a sectional view taken along the line V—V of FIGURES 3 and 7.

FIGURE 9 is a front elevational view of a modified form of valve manifold embodying the invention.

FIGURE 10 is a sectional view taken along the line X—X of FIGURE 9.

FIGURE 11 is a sectional view taken along the line XI—XI of FIGURES 10 and 13.

FIGURE 12 is a sectional view taken along the line XII—XII of FIGURE 10.

FIGURE 14 is a front view of yet another modification.

GENERAL DESCRIPTION

Figure 3:
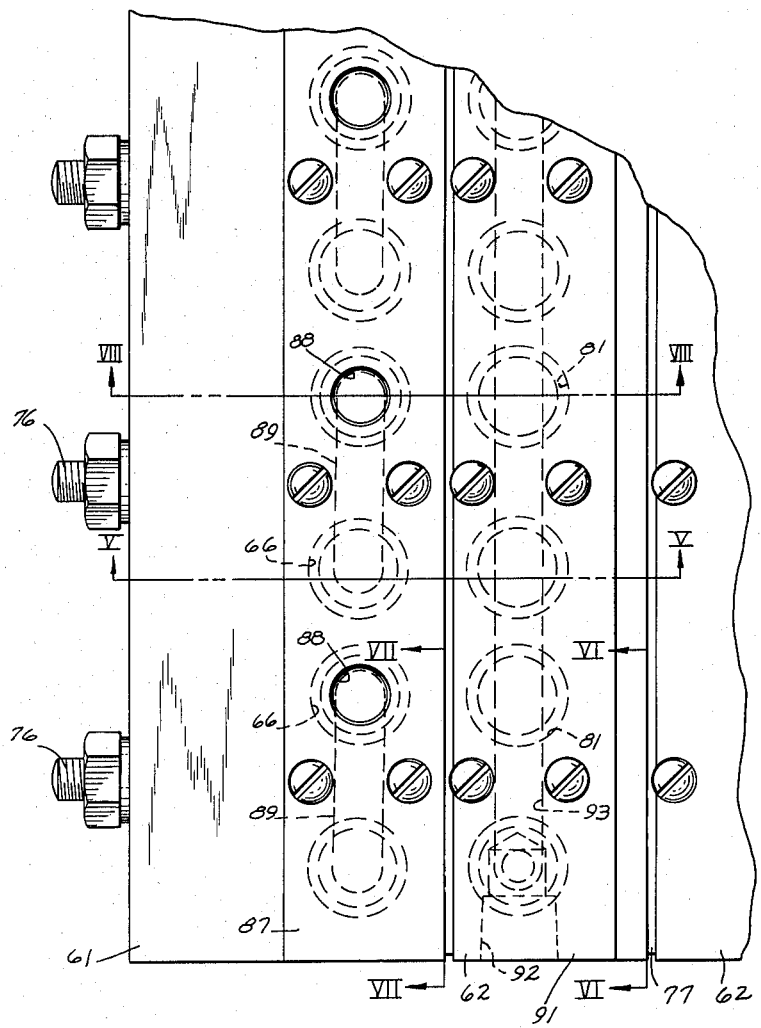
FIGURE 3 is a top plan view of another type of valve manifold embodying the invention.
Figure 6:
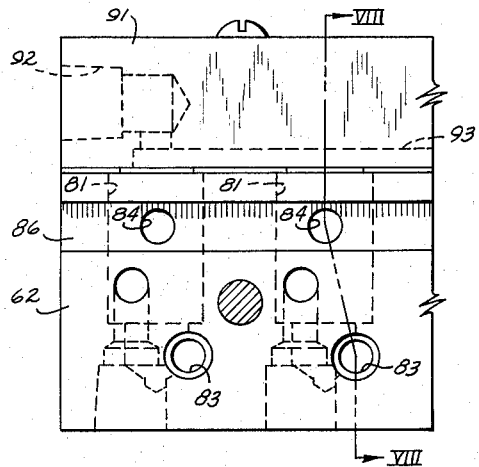
FIGURE 6 is a sectional view taken along the line VI—VI of FIGURE 3.
Figure 7:
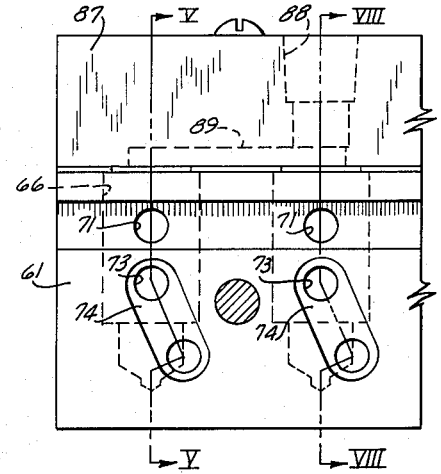
FIGURE 7 is a sectional view taken along the line VII—VII of FIGURE 3.
Figure 8:
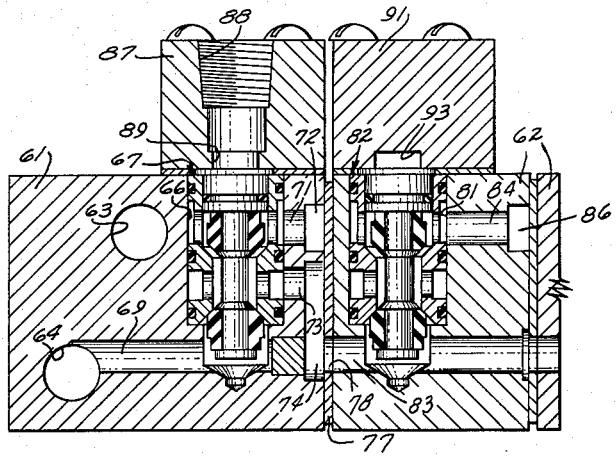
FIGURE 8 is a sectional view taken along the line VIII—VIII of FIGURES 3, 6 and 7.
Figure 13:
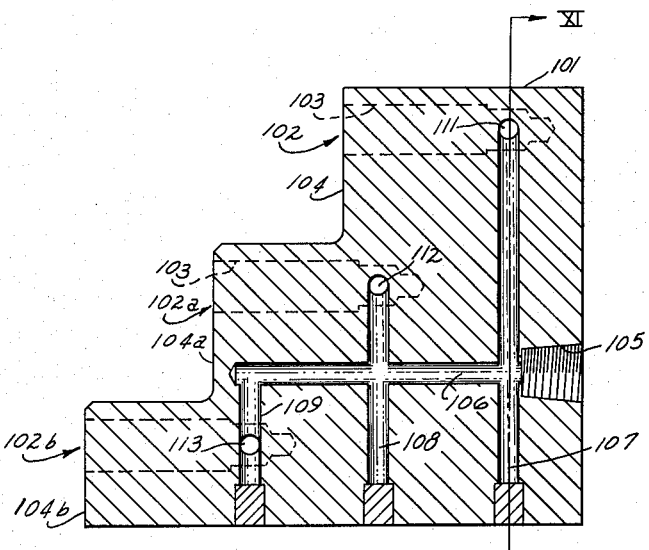
FIGURE 13 is a sectional view taken along the line XIII—XIII of FIGURE 9.

According to the invention there is provided a valve manifold construction comprising a block or manifold housing having a plurality of valve openings therein. Insert-type valve units are disposed in the valve openings. The valve units can be of many types, such as two-way valves or three-way valves or combination of these. The valves can be arranged so that they operate independently of each other in a predetermined sequence or they can be arranged in groups where the operation of at least one of the valves in each group is responsive to operation of another valve of the group. The valves can be arranged for operation by pilot pressure, by solenoid actuators or by various mechanical actuators, such as cams or push buttons, or various combinations of the foregoing. Where pilot pressure is used, said pilot pressure is isolated from the main pressure fluid being controlled.

It is particularly preferred to retain the insert valve units in the manifold housing by means of a cover plate which also serves to supply a force, such as pressure fluid or mechanical, to actuate the respective valve units. Moreover, it is preferred to arrange the valve openings so that a common supply conduit can be provided in the manifold housing simultaneously to supply pressure fluid to the valve openings. Further, the outlet and exhaust conduits are provided in the manifold housnig so that the external piping arrangements are considerably simplified.

The various conduits are arranged in the manifold housing in a simplified fashion so that they can be formed by simple machining operations, such as by drilling.

The insert valve units preferably comprise a housing having at least one peripheral groove between its ends communicating with an outlet conduit in the manifold housing. The valve housing has a central passageway communicating with the peripheral groove. Pressure fluid is supplied to one end of the housing and a valve seat is provided between said end and the central passageway. A valve rod is movable within the central passageway and it carries adjacent one end thereof a valve element which is engageable with the valve seat. The valve rod can be moved by means which act on the other end of the valve rod. If desired, the valve housing may have a second peripheral groove and the valve rod may carry a second valve element engageable with another valve seat provided in the central passageway between the grooves.

DETAILED DESCRIPTION
*(FIGURES 1 and 2)*

Referring to FIGURES 1 and 2, which illustrate one preferred embodiment of the invention, the manifold valve construction 10 is comprised of a block 11 and a cover plate 12 which are releasably secured together by means of the bolts 13 with a gasket 15 being interposed therebetween. The block 11 has a plurality of pairs, here five pairs, of identical valve openings therein. One valve opening of the respective pairs is identified by the reference numeral 14 and the other valve opening is identified by the reference numeral 16. Since the valve openings 14 and 16 in the respective pairs are identical and the same valve units are placed therein, only one pair of valve openings will be described herein.

The valve openings 14 and 16 open through the upper surface of the block 11 which upper surface is covered by the plate 12. The valve openings 14 and 16 preferably are circular in cross section and are similar to each other except that valve openings 16 are longer than the opening 14. Thus, valve opening 14 is comprised of an elongated, cylindrical portion 14a, a relatively short cylindrical portion 14b of reduced diameter which is connected by means of a frusto-conical portion 14c to a cylindrical end cavity 14d having a conical end 14e. The corresponding parts of the valve opening 16 are identified by the reference numeral 16 with the same suffixes as used in connection with the corresponding parts of valve opening 14.

Similar valve units 17 and 18 are disposed in the elongated portions 14a and 16a of the valve openings 14 and 16, respectively. The upper end of valve unit 17 is substantially flush with the upper surface of the block 11 while the upper end of valve unit 18 is spaced an appreciable distance from said surface. A cylindrical spacer and retainer sleeve 19 is received in the opening 16 and extends from the upper end of said valve unit 18 to a point substantially flush with the upper surface of the block 11.

The cover plate 12 has a central pilot pressure supply port 21 which has a circular enlargement 22 which overlaps the upper ends of the valve openings 14 and 16 so that pilot pressure from a suitable source (not shown) can be simultaneously supplied to both valve openings. It is to be noted that the portions 23 and 24 of the bottom surface of the cover plate 12 adjacent the opposite sides of the enlargement 22 overlie the upper ends of the respective valve openings 14 and 16 and engage the upper end of the valve unit 17 and the upper end of the sleeve 19 whereby both valve units are held in place. By removing the cover plate 12, the valve units 17 and 18 can be removed from the block.

The valve units 17 and 18 here are identical so that only valve unit 17 will be described in detail, it being understood that this description also applies to the valve unit 18. The parts of valve unit 18 corresponding to those in valve unit 17 are identified with the same reference numerals with the suffix "a" added thereto.

The valve unit 17 is comprised of a cylindrical valve body 26 having three axially spaced-apart, radially extending flanges 27, 28 and 29, each of which has an O-ring 31 mounted in a groove in its periphery for sealingly engaging the wall of the cylindrical portion 14a of the valve opening 14. The valve body 26 has an enlarged chamber 32 at its upper end and also has a central passageway 33 extending away from the chamber 32 and having valve seats 34 and 35 at its respective axial ends. A valve stem 36 extends through the chamber 32 and the passageway 33 and thence out through the lower end of the valve body 26. A piston 37 is mounted on or is integral with the stem 36 and is slidable in the chamber 32. A valve element 38 is mounted on the stem 36 immediately below the piston 37 and said valve element is adapted to engage the valve seat 34. Another valve element 39 is mounted on the stem 36 adjacent the opposite end thereof and it is adapted to engage the valve seat 35. The length of the valve rod 36 is such that when one of the valve elements engages its associated valve seat, the other valve element is spaced from its associated valve seat.

The valve body 26 has a first set of ports 41 extending from the chamber 32 below the piston 37 to an annular groove 42 formed between the flanges 27 and 28. A second set of ports 43 extend from the passageway 33 to an annular groove 44 formed between the flanges 28 and 29.

The block 11 has a first passageway 46 communicating with groove 42, a second passageway 47 communicating with groove 44 and a third passageway 48 communicating with the end cavity 14d of valve opening 14. The block 11 has a fourth passageway 49 extending from the end cavity 14d and communicating with the groove 42a in the valve unit 18. A fifth passageway 51, which is closed by a plug 52, extends from the groove 42a. A sixth passageway 53 extends from the groove 44a of valve 18 and a seventh passageway 54 extends from the end cavity 16d of valve opening 16.

It will be observed that the valve openings 14 and 16 and the various passageways in the block, referred to immediately above, all are straight so that they can be formed by suitable drilling and, if necessary, reaming and/or tapping of a solid metal block.

While the various passageways can be connected into input, output and exhaust in various ways, and such is an advantage of the invention, the operation of this manifold valve will be described with reference to an arrangement in which the passageways 46 and 54 are connected to exhaust, passageways 47 and 53 are connected to outputs, or loads, and passageway 48 is connected to a source of input pressure (not shown) by a conduit 50. It is pointed out that the conduit 50 supplies pressure fluid to all of the pairs of valves although other arrangements can be provided if desired.

In operation the pressure in passageway 48 will act on the lower end of the valve stem 36 and will urge same upwardly to close valve element 39 against the valve seat 35 and thereby space valve element 38 from valve seat 34 so that passageway 47 is connected to passageway 46. The pressure in passageway 48 also will act on the lower side of piston 37a of valve unit 17 to raise the valve stem 36a so that the pressure fluid will flow into the passageway 53. The passageway 54 will be blocked by engagement of the valve element 39a against the valve seat 35a. In this position of the parts the pressure fluid flows from passageway 48 to passageway 53 and passageway 47 is connected to passageway 46.

When fluid pressure is supplied to the pilot pressure port 21, the piston 37 will be moved downwardly to cause passageway 48 to be connected to passageway 47. Simultaneously, since the area against which the pilot pressure acts on the piston 37a is greater than the area on the under side of said piston against which acts the pressure fluid from passageway 48, piston 37a also will be moved downwardly to place passageways 53 and 54 in communication. Release of the pilot pressure will cause the valve stems to be returned to their original positions.

FIGURES 3 through 8

FIGURES 3 through 8 show another modification in which the valve manifold is comprised of an input block 61 and a plurality of output blocks 62. Only two output blocks 62 are shown but it is apparent that additional output blocks can be used, if desired.

The input block 61 has two passageways 63 and 64 which are both connected to suitable sources of pressure fluid (not shown). The input block 61 has a series of valve openings 66 into which are received valve units 67 which correspond to the valve units 17 and 18, previously described.

Branch passages 68 (one shown) connect passageway 63 to every other one of the valve openings 66 at the bottom thereof and branch passages 69 (one shown) connect the passageways 64 to the remaining ones of the valve openings at the bottom thereof.

The exhaust ports 71 of all the valve openings 66 are connected to a channel 72 in the block 61, which channel communicates with the atmosphere. The outlet ports 73 of the respective valve openings 66 are connected to the upper end of passages 74 which are inclined (see FIGURE 7) so that their lower ends are offset from the lengthwise center line of the valve openings.

The input block is fixedly secured to the output blocks 62 by means of bolts 76. Gaskets 77 are disposed between adjacent blocks with said gaskets having openings 78 therethrough communicating with the lower ends of the passages 74.

The output blocks 62 each have a series of valve openings 81 into which are received valve units 82 which correspond to the valve units 17 and 18. Passages 83, each of which communicates with one of the openings 78 and intersects the lower ends of one of the valve openings 81, pass through the block and communicate with corresponding passages in the adjacent output block. The exhaust port 84 of each valve opening 81 communicates with an outlet channel 86, which in turn communicates with the atmosphere. The outlet port 85 of each valve opening is adapted for connection to a load device.

A pilot valve block 87 is mounted on the input block 61 and it holds the valve units 67 in position in the input block 61 as in the previously described embodiment of the invention. While various arrangements are possible, in this embodiment the input block 61 has a series of pilot pressure input ports 88 each of which is connected to the upper ends of two of the valve openings 66 by a passage 89 so that when pilot pressure is supplied to the respective ports 88, the two valve units associated therewith are shifted to a position in which their outlet ports 73 are connected to the passageways 63 and 64, respectively, to thereby supply pressure fluids to the associated valve openings in the blocks 62. When pressure fluid is supplied to the lower ends of the valve openings 81 in blocks 62, the valve rods of valve units 82 are moved upwardly to seat the lower valve member against its associated seat.

A pilot pressure block 91 is mounted on each of the output blocks 62 and serves to hold the valve units 82 therein as in the previously described embodiment of the invention. Again, various arrangements for actuating the valve units 82 are possible but in this embodiment, the pilot valve block 91 has a single pilot pressure input port 92 which is connected by a passage 93 to the upper ends of each of the valve openings 81 so that when fluid pressure is supplied to said input port 92 all of the valve units 82 are shifted to place their input passages in communication with their respectively associated outlets 85.

Thus, the outlets 85 are normally connected to exhaust but when pressure fluid is supplied to the ports 88 and pressure fluid is supplied to port 92, pressure fluid will flow through the outlets 85. The pressure fluid supply passages 63 and 64 can be connected to supply the same or different pressure fluids at the same or different pressures so that the load devices connected to outlets 85 can be operated in whatever fashion is desired. Similarly by adjusting the number and connections of the ports 88 and 92 a wide variety of different functions can be controlled.

FIGURES 9 through 13

Referring to FIGURES 9 through 13, the manifold valve construction 100 is comprised of a stepped block 101 which has three rows 102, 102a and 102b of valve openings 103 formed therein. The openings 103 in the respective rows are provided in the offset vertical front surfaces 104, 104a and 104b of the block 101.

An inlet opening 105 is provided in the rear surface of the block and it has a passageway 106 extending therefrom into the block. Three passages 107, 108 and 109 branch off from the passageway 106 at spaced points therealong. As shown in FIGURE 11 with respect to passage 107 a lateral passageway 111 extending from the passage 107 communicates with each of the valve openings 103 in the row 102. The manifold passages 108 and 109 have similar lateral passageways 112 and 113 extending therefrom and communicating with the valve openings in the rows 102a and 102b, respectively. The lateral passageways 112 and 113 are arranged in the same fashion as passageways 111 and, hence, are not believed to require detailed description. Thus, supply of pressure fluid to the inlet opening 105 effects simultaneous supply of pressure fluid to each of the valve openings 103 in the block 101.

Identical valve units 116 are disposed in each of the valve openings 103. Here the valve units 116 are of the two-way type and each of them comprises a cylindrical valve housing 117 which is retained against a shoulder 118 of the valve opening 103 by a spacer sleeve 120 and a retaining ring 119. The housing 117 has a pair of annular flanges 121 which define a groove 122 and each of said flanges has an O-ring 123 mounted in an annular recess in the periphery thereof in order to isolate the groove 122 from the ends of the valve housing.

The valve housing has a central passageway 126 which is provided with a valve seat 127 at the inner end thereof and also is provided with an opening 128 communicating with the groove 122. A valve rod 129 is slidable within the passageway 126 and it carries a valve element 131 which is sealingly engageable with the valve seat 127.

While the valve rod 129 can be moved within the passageway 126 by a variety of means, in this embodiment the valve rod 129 extends through the other end of the housing and is provided with an operating head 132 which is movable longitudinally within the valve opening 103. The operating head 132 is urged outwardly by a spring 133. Thus, the valve element 131 is normally held in engagement with the valve seat 127.

Suitable mechanical means is arranged in association with the valves for engaging the operating heads 132 thereof in order to move same inwardly to thereby move the valve rods 129 inwardly in order to move the valve elements 131 away from their associated valve seats 127. Here the mechanical means which is shown in association with two of the valves in FIGURE 12 is a bar 134 having a cam 135 thereon for engaging the heads 132. It will be apparent that various other cam arrangements can be provided so that the valve rods 129 can be actuated in whatever desired sequence is needed. Further, other actuating means, such as pilot pressure supply means as in the previously described embodiments of the invention, solenoids and other conventional valve actuators can be used if desired.

The lateral passages 111, 112 and 113 communicate with the valve openings 103 so that fluid pressure is supplied to the zone 136 between the valve seat 127 and the blind end of the valve opening. Outlet passages 138 are provided in the block 101 and these communicate with respective grooves 122 and extend through the bottom surface of the block 101 for connection to the respective load devices.

Thus, in use, pressure fluid is supplied to each of the valve openings 103 but such fluid is prevented from moving farther because the valve elements 131 normally sealingly engage their associated valve seats 127. When the respective valve rods 129 are moved inwardly, the valve elements 131 are moved away from the valve seats 126 and then pressure fluid can flow from the zone 136 into the outlet passages 138. Such movement of the valve rods is affected in this embodiment by the cam 135 on the bar 134, although other means for actuating the valve rods can be provided if desired.

*FIGURES 14–16*

Figure 16:
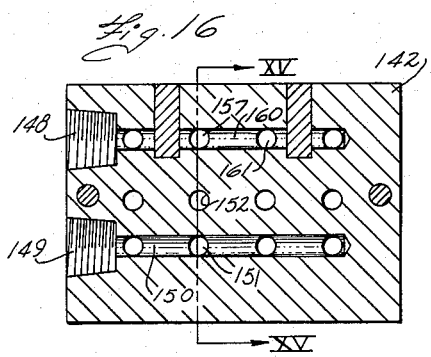
FIGURE 16 is a sectional view taken along the line XVI—XVI of FIGURE 15.
Figure 15:
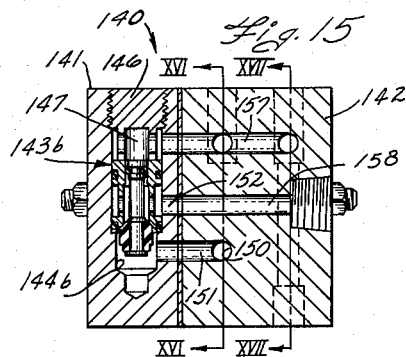
FIGURE 15 is a sectional view taken along the line XV—XV of FIGURE 14.
Figure 17:
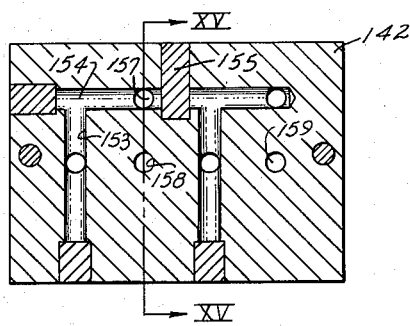
FIGURE 17 is a sectional view taken along the line XVII—XVII of FIGURE 15.

FIGURES 14 through 16 disclose yet another modified manifold valve construction 140 utilizing the valve system above described with a valve block 141 and a back plate 142. Again, the specific details are unimportant and are used only to illustrate the flexibility obtained by using the back plate 142.

In this embodiment, a plurality of valves, here two-way valves 143, are mounted in appropriate openings 144a–d in the valve block. The valves of which one appears at 143 are substantially the same as the valve units 116 previously described and hence need no further detailing. The valves 143 are held in place by retainers 146 which have a central opening 147 whereby pilot pressure fluid can be applied to the valve rod to shift same. Pilot pressure is supplied to an opening 148. The main pressure fluid is supplied to an opening 149 connected by passages 150 and 151 to the valve openings, as opening 144b. When the valve 143 is moved to its open position the main pressure fluid passes through the outlet 152 into the back plate 142.

The back plate 142 has suitable passages, such as passages 153 and 154, whereby pressure fluid can be supplied from one valve to serve as a pilot pressure source for other valves by plugging the opening 154 at 155 and providing connection 157 from passageway 154 to the passageway 147 of the valve in opening 144b to be so controlled. A further passageway 160 is provided to conduct the pilot pressure from passageway 157 also to passageway 161 whereby to provide pilot pressure to the valve in opening 144c to actuate same. The back plate 142 also may have outlet openings 158 and 159 for connecting the outlet ports of the selected valves to load devices. In the particular embodiment shown, the external pressure at 148 actuates the valve in opening 144a whose output is delivered by passageways 153 and 154 to provide the pilot pressure to actuate both of the valves in openings 144b and 144c. The output of the valve in opening 144c is connected as shown to the pilot of the valve in opening 144d.

It will be apparent that a wide variety of modifications of this basic arrangement can be made such as by connecting the pilot pressure supplies and the main pressure fluid supplies in varying patterns to the several valves. In particular, the arrangement of passages in the back plate 142 can be varied widely so that fluid pressure can travel between various valves and between said valves and load devices in any desired fashion and so that the specific functioning of a given valve block 141 can be readily and quickly changed merely by changing the back plate 142.

Thus, it will be seen that the invention provides a valve manifold construction employing simple insert valves which are stock items. The valves are arranged so that they can be manipulated easily and conveniently in various ways so that the load devices can be operated in whatever fashion is desired. Further, the manifold housing is provided with passageways arranged so that the load devices and the pressure fluid supplies can simply be connected to the manifold in order to reduce the amount of external piping.

Although particular preferred embodiments of the invention have been disclosed above for illustrative purposes, it will be understood that variations or modifications of such disclosures, which lie within the scope of the appended claims, are fully contemplated.

What is claimed is:

1. A valve manifold construction, comprising:

a block having at least a pair of parallel, adjacent valve openings therein which open at their outer ends through one surface of said block and which extend only partway through said block so that the inner ends thereof are closed;

valve units slidably disposed within said valve openings, said valve units each including a housing having at least one peripheral groove and a central passageway, a first port for supplying fluid to one end of said passageway, a second port extending from said groove into said passageway, a valve seat in said passageway between said ports, a movable valve element engageable with said seat, each of said valve units also having fluid pressure responsive means slidably disposed in said valve opening adjacent said one surface of said block and connected to said valve element whereby supply of fluid pressure to said valve openings through said one surface of said block will effect movement of said valve elements toward or away from said seats;

first passage means in said block and communicating with said grooves of said valve units;

second passage means in said block and communicating with said grooves of said valve units;

a cover plate mounted on said one surface of said block, said plate having a pilot pressure supply port communicating with both valve openings in said block whereby pilot pressure can be supplied to effect simultaneous movement of both of said valve elements, said cover plate having peripheral wall portions around said pilot pressure supply port, said wall portions overlying portions of said valve openings and engaging one end of said valve housings for retaining same within said block and preventing movement thereof with respect to said block.

2. A valve manifold construction according to claim 1, in which the outer portion of one of said valve openings is longer than the other so that the shoulders in the respective valve openings are offset;

spacer means in the longer one of said valve openings between the wall portions of the cover plate and the valve unit for holding the valve unit therein against the shoulder thereof, said block having a conduit extending between the inner portion of the shorter valve opening and the groove in the valve housing in the longer valve opening.

3. A valve manifold construction comprising:

a block having at least a pair of parallel, adjacent, circular valve openings therein which open at their outer ends through one surface of said block and which extend only partway through said block so that the inner ends thereof are closed, each of said openings including an inner portion and an outer portion, said block having opening means defining first conduit means extending substantially perpendicularly to the axes of said valve openings and intersecting the inner portions of said valve openings, said block also having passage means defining second conduit means extending substantially perpendicularly to the axes of each of said valve openings and intersecting the outer portions of said valve openings;

valve units slidably disposed within said valve openings, each of said valve units having a circular housing of the same diameter as said outer portion of said valve opening, said housing being snugly but slidably received within said outer portion and means for supporting said housing in said outer portion, said housing having at least one peripheral groove in continuous communication with said second conduit means, said housing having a central passageway communicating with said inner portion of said valve opening and a port extending from said central passageway to said groove, a valve seat in said passageway between said port and said inner portion of said valve opening, a movable valve element engageable with said seat and operating means slidably disposed in said valve housing adjacent to the outer end of said outer portion of said valve opening for moving said valve element toward and away from said valve seat; and means operable adjacent the outer end of said outer section for actuating said operating means.

4. A valve manifold construction according to claim 3, in which said block has at least two rows of valve openings therein, said first conduit means including a main passageway, branch passageways extending from said main passageway to each of said rows of valve openings and a common passage extending between the inner ends of the valve openings in each row and intersecting one of said branch passages.

5. A valve manifold construction according to claim 3, including at least one additional block attached to said first mentioned block and having valve openings therein each of which is associated with one of the valve openings in the first-mentioned block, is similar in construction and has a similar valve unit therein, said blocks having means defining a passage extending from the grooves in the valve housings in the first mentioned block to the inner portion of the associated valve openings in said additional block.

6. A valve manifold construction according to claim 5, in which said first conduit means includes a plurality of conduits, each of which is connected only to selected one of the valve openings in said first mentioned block.

7. A valve manifold construction according to claim 3, in which said first conduit means is straight and lies in a plane perpendicular to the axes of said valve openings and in which said second conduit means lie in a common plane perpendicular to the axis of said valve openings.

8. A valve manifold construction comprising:

block means having a pair of parallel, adjacent, circular valve openings therein which open at their outer ends through one surface of said block means, each of said openings including an inner portion and an outer portion, said block means having a first conduit formed therein and extending substantially perpendicularly to the axes of said valve openings and intersecting the inner portion of one of said valve openings, said block means also having a second conduit formed therein and extending substantially perpendicularly to the axes of said valve openings and intersecting the outer portion of said one valve opening;

valve units slideably disposed within said valve openings, each of said valve units having a circular housing of the same diameter as said outer portion of its associated valve opening, said housing being snugly but slideably received within said outer portion and means for supporting said housing in said outer portion;

said housing in said one valve opening having a first peripheral groove in continuous communication with said second conduit means, a first central passageway communicating with said inner portion of said one valve opening and a first port extending from said first central passageway to said first groove, a first valve seat in said first passageway between said first port and said inner portion of said one valve opening, a first movable valve element engageable with said first seat and first operating means adjacent to the outer end of said outer portion of said one valve opening for moving said first valve element toward and away from said first valve seat;

a third conduit in said block means connecting said one valve opening to said other valve opening;

said housing in said other valve opening having a second peripheral groove, a second central passageway communicating with said third conduit, a second valve seat in said second passageway and a second port on the opposite side of said second valve seat from said third conduit, said second port communicating with said second central passageway and said second peripheral groove, a second movable valve element engageable with said second seat and second operating means adjacent to the outer end of said other valve opening for moving said second valve element toward and away from said second seat; and a fourth conduit in said block means and communicating with said second peripheral groove.

9. A valve manifold construction according to claim 8, in which said third conduit connects the outer portion of said one valve opening to the inner portion of said other valve opening.

10. A valve manifold construction according to claim 8, in which said third conduit connects the inner portion of said one valve opening to the outer portion of said other valve opening.

11. A valve manifold construction comprising:

block means having at least a pair of parallel, adjacent circular valve openings therein which open at their outer ends through one surface of said block means, each of said openings including an inner portion of reduced diameter and an outer portion of enlarged diameter, said block means having a first conduit formed therein and intersecting the inner portion of one of said valve openings, said block means also having a second conduit formed therein and intersecting the outer portion of said one valve opening;

valve units slideably disposed within said valve openings, each of said valve units having a circular housing of the same diameter as said outer portion of its associated valve opening, said housing being snugly but slideably received with said outer portion and resting on the shoulder formed between said inner and outer portions;

said housing in said one valve opening having a first peripheral groove in continuous communication with said second conduit, a first central passageway communicating with said inner portion of said one valve opening and a first port extending from said first central passageway so said first groove, a first valve seat in said first passageway between said first port and said inner portion of said one valve opening, a first movable valve element engageable with said first seat and first operating means adjacent to the outer end of said outer portion of said one valve opening for moving said first valve element toward and away from said first valve seat;

a third conduit in said block means connecting said second conduit to the inner portion of said other valve opening;

a fourth conduit in said block means;

said housing in said other valve opening having a second peripheral groove in continuous communication with said fourth conduit, said last-named housing having a second central passageway communicating with said inner portion of said other valve opening and a second port extending from said second central passageway to said second groove, a second valve seat in said second passageway between said second port and said inner portion of said other valve opening, a second movable valve element engageable with said second seat; and second operating means adjacent to said outer portion of said other valve opening for moving said second valve element toward and away from said second seat.

12. A valve manifold according to claim 11, in which said block means comprises two blocks which are connected together and each of which has a valve opening therein, said blocks having parallel mating faces and said third conduit being formed in one of said mating faces.

13. A valve manifold according to claim 12, in which said operating means for the respective valve elements includes a pair of pilot valve blocks each secured to said one surface of one of said blocks and having a further conduit therein communicating with the outer end of its associated valve opening.

References Cited by the Examiner

UNITED STATES PATENTS 3,002,530  10/1961  Gibbs _____ 137—608 X
3,042,072  7/1962  Humphrey ____ 137—625.27 X MARTIN P. SCHWADRON, *Acting Primary Examiner.*